Figure 1:
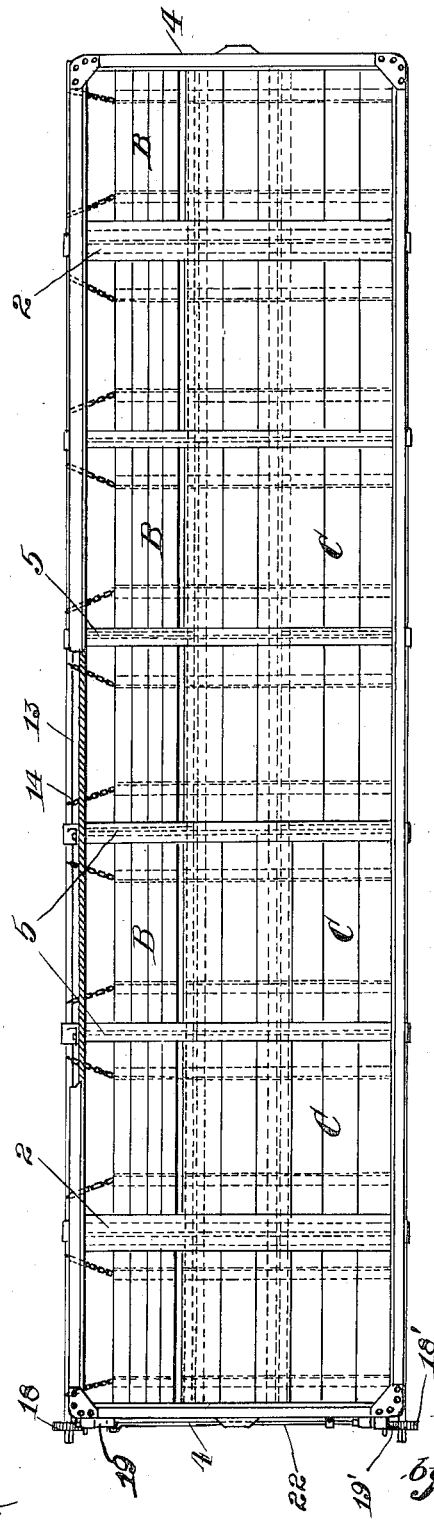

A. LIPSCHUTZ.
DUMP CAR.
APPLICATION FILED MAY 23, 1908.

922,923.

Patented May 25, 1909.
3 SHEETS—SHEET 1.

Witnesses:
Arthur Nelson
John R. Lefevre

Inventor:
Arthur Lipschutz
by [signature]
Atty.

A. LIPSCHUTZ.
DUMP CAR.
APPLICATION FILED MAY 23, 1908.

922,923.

Patented May 25, 1909.
3 SHEETS—SHEET 2.

Witnesses:
Arthur W. Nelson
John R. Lepore

Inventor:
Arthur Lipschutz
by
Atty.

A. LIPSCHUTZ.
DUMP CAR.
APPLICATION FILED MAY 23, 1908.
922,923.
Patented May 25, 1909.
3 SHEETS—SHEET 3.
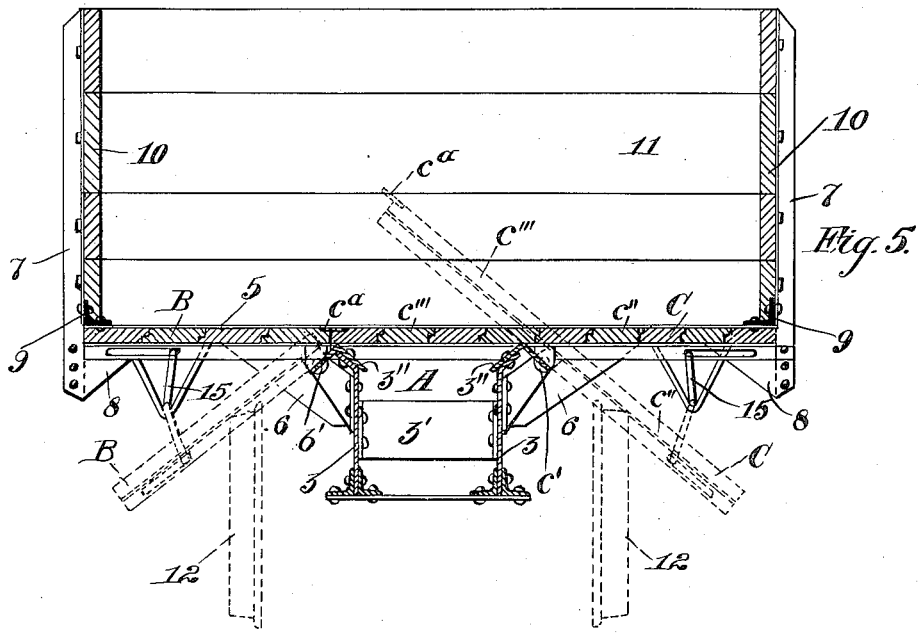
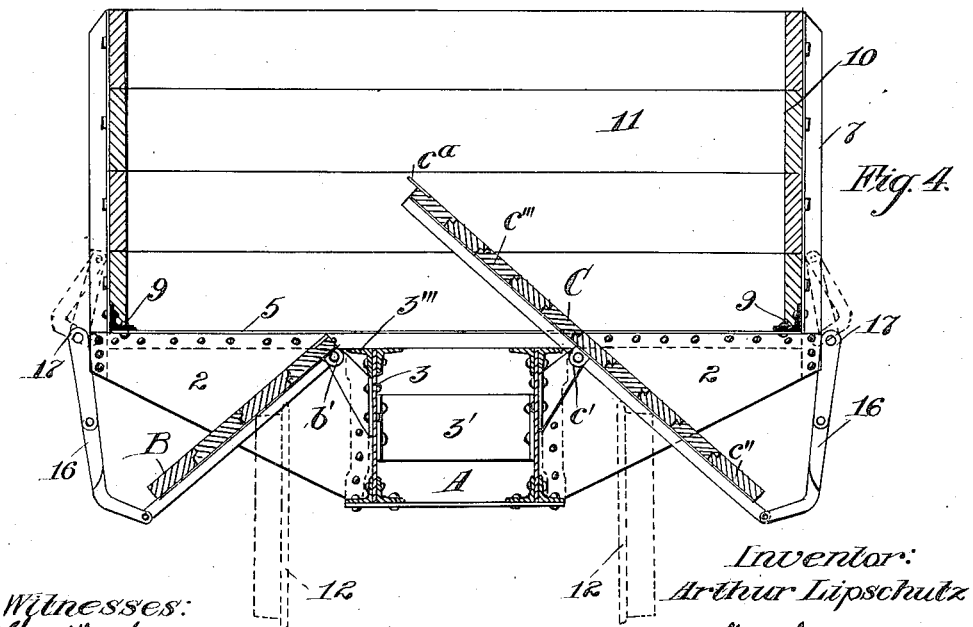
Witnesses:
Inventor:
Arthur Lipschutz

UNITED STATES PATENT OFFICE.

ARTHUR LIPSCHUTZ, OF CHICAGO, ILLINOIS, ASSIGNOR, BY MESNE ASSIGNMENTS, TO NATIONAL DUMP CAR COMPANY, OF CHICAGO, ILLINOIS, A CORPORATION OF MAINE.

DUMP-CAR.

No. 922,923.　　　Specification of Letters Patent.　　　Patented May 25, 1909.

Application filed May 23, 1908. Serial No. 434,537.

*To all whom it may concern:*

Be it known that I, ARTHUR LIPSCHUTZ, a citizen of the United States, and resident of Chicago, Cook county, Illinois, have invented new and useful Improvements in Dump-Cars, of which the following is a true, clear, and exact description, such as will enable others skilled in the art to which it appertains to make and use the same.

My invention relates to improvements in dump cars and has special reference to such as have flat floors composed of drop doors adapted to discharge the load, when released and dropped.

The object of my invention is to provide an improved dump car which may be used either as an ordinary freight car for carrying packaged goods, or as a dump car for transporting bulk materials, such as ore, coal, sand and gravel.

A further and special object of the invention is to provide a dump car which shall have a substantially flat or level floor extending from end to end of the car and from side to side thereof and in effect wholly composed of drop doors, adapted to discharge the whole load; a special purpose of the invention being to provide for the complete emptying of the car without shoveling or manually handling any part of the load.

Another object of the invention is to provide a car of minimum height and in which the doors when dropped shall incline at such angles as to insure the free discharge of the material from the car.

Another object is to provide a car which in a practical sense shall have no flat surfaces between its drop doors, but which shall nevertheless be constructed in such manner that when the doors are dropped, i. e. in inclined positions, workmen may freely and safely walk from end to end of the car upon the center sill thereof.

Dump cars which are adapted to discharge the whole load, as distinguished from those which necessitate shoveling, ordinarily have doors that extend substantially from the center or middle line of the car to the sides thereof, the hinged edges of the two sets of doors being either co-incident or separated by so small a space as to leave only a narrow ridge between the doors when dropped. Such doors are necessarily of large size and their weight is such as to make them difficult to operate. Furthermore, such doors necessarily carry the weight of the whole load and transmit excessive strains to the lifting and locking devices, by which their free edges are secured to the sides of the car. To overcome these difficulties I provide a car with two sets of doors of different sizes which together make up practically the entire floor of the car. These doors are hinged at substantially the same distances from respectively adjacent sides of the car and the larger doors practically overlap the smaller doors.

The hinges of the two sets of doors are parallel and are separated by a space nearly equal to that between the hinge lines and the sides of the car. The larger doors, obviously are not hinged at their inner ends but at intermediate points and the load resting upon the inner ends or portions of these doors partly balances that which rests on their outer ends. The effective length of the doors (between hinge and car side) is less than in other cars of the kind and hence the doors may be operated and supported by devices of less weight and size than usual. This is particularly true of the doors which are intermediately pivoted and partly counterbalanced. The height of a dump car is practically determined by the angle to which it is possible to drop the doors over the trucks, and in my car, as the doors are relatively narrow, the requisite pitch may be secured with the car floor at a minimum altitude. In other words I am able to make my car much lower than other cars of its class.

Figure 3:
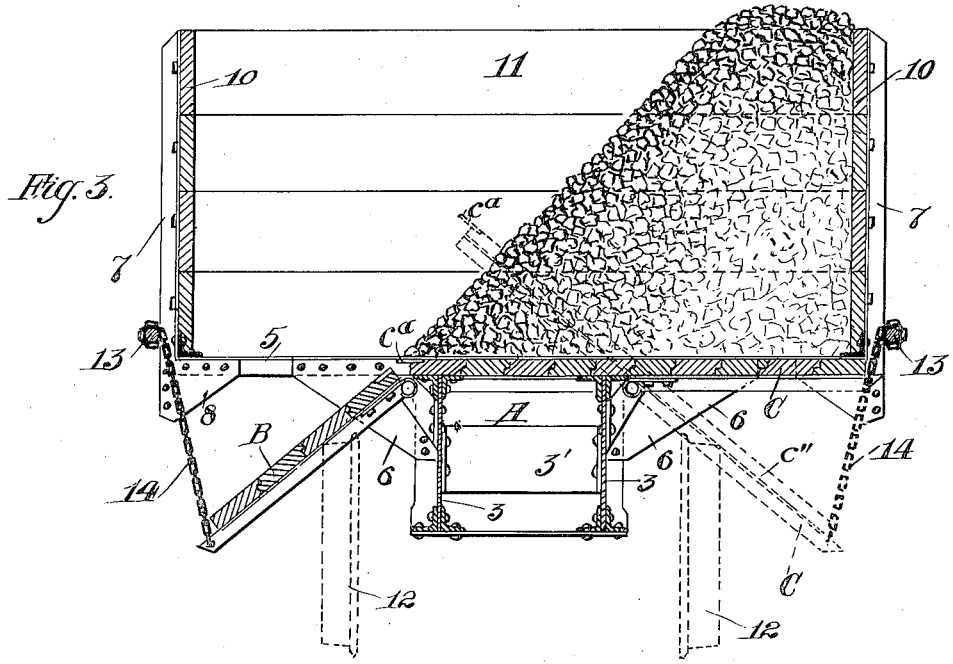
Figure 2:
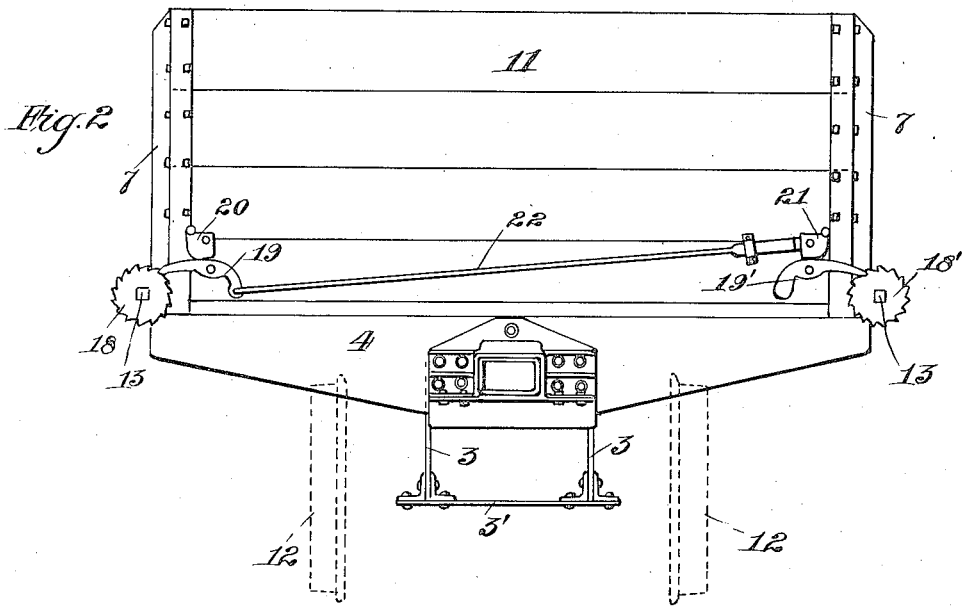

Other objects and the detailed construction of a car embodying my invention in preferred form appear hereinafter and will be more readily understood by reference to the accompanying drawings forming a part of this specification and in which;

Figure 1 is a plan view of a car embodying my invention; Fig. 2 is an enlarged end view thereof; Fig. 3 is a sectional view of the car showing one set of doors dropped; Fig. 4 is a similar view showing both sets of doors open; and Fig. 5 shows both doors raised or closed. Incidentally Figs. 4 and 5 illustrate modified forms of door operating mechanisms.

I desire that it shall be understood that these drawings illustrate a car which is typical of my invention. They do not exhaustively show the numerous forms in which the car may be built and it is not my purpose to confine or limit the invention to the specific structures herein shown.

The appended claims, rather than the drawings, of this specification, indicate and set forth the character and scope of the invention.

The drawings illustrate a car having a steel underframe and wooden sides and ends supported by side stakes. My invention is admirably adapted to such car construction and may also be advantageously embodied in cars having underframes of the kind found in ordinary box cars where the center sill members are spaced apart and are in the same plane with the side sills.

In the drawings, 2—2, represent the body bolsters of the car and 3—3 the principal, longitudinal members of the wide center sill, A. The members, 3—3, are connected at intervals by plates and diaphragms, 3′. The members, 3 and 3′ constitute a center sill which in width is nearly equal to one-third of the width of the car. The sill is not provided with top and bottom plates after the manner of a box girder, but is open at the top and bottom between the member, 3—3. The plates or members, 3′, do not materially obstruct the opening between the members, 3—3. The center sill members are framed into or joined to the body bolsters as indicated in Fig. 4. 4—4 are the end sills of the car, joined to the body bolsters by the center sill extensions that constitute the draft sills of the car. Cross bearers or cross beams, 5—5, divide the space between the body bolsters. The cross beams, 5, rest on the center sill and are connected therewith and reinforced by vertical transverse plates, 6—6, as shown in Figs. 3 and 5. The side stakes, 7—7, rise from the ends of the several transverse members, the connections being reinforced by suitable plates, 8. Floor plates or angles, 9, are secured upon the ends of the bolsters and beams 2 and 5, and their vertical flanges are riveted to the side stakes, 7. The sides, 10 and the ends, 11, of the car may be constructed of planks secured as shown to the side stakes, 7.

The tops of the bolsters, 2, and the tops of the cross beams, 5, define the floor surface of the car and these beams are provided with flanges against which the drop doors close, when the doors are raised (see Fig. 5). An underframe of this construction contains three sets of floor openings extending from end to end of the car. The set of openings at one side of the center beam are closed by drop doors, B, and the opposite set by drop doors, C, which latter also serve to close the middle set of openings, between the longitudinal members of the center sill. The doors, B—B, are of uniform length and are substantially uniform in width. The word length as here used is intended to define the distance between the hinge of the door and the free edge or end thereof. The doors, B, are attached to the center sill A by hinges, b′, and are adapted to close respective openings between the center sill and the adjacent side of the car. The doors, C, are attached to the center sill by hinges, c′ and these doors are long enough to reach from the side of the car to the inner ends of the doors, B. In other words the doors, C, are intermediately pivoted or substantially balanced on their hinges, extending in both directions therefrom. The outer portion, c″, of the door, C, is longer, however, than the inner portion, c‴, in order that the weight of the load upon the outer portion of the door may overbalance the load upon the inner portion or end of the door.

When both sets of doors are closed they constitute a flat, level and unbroken floor which extends from side to side of the car and from end to end thereof. The bolsters and the cross beams constitute so small a portion of the floor area as to be a negligible factor thereof and from this standpoint I describe my car as having a floor which is wholly composed of drop doors. The doors, C, are preferably provided with edge plates, $c^a$, which overlap the doors, B, and close the joints between the sets of doors.

If desired the inner ends or portions, c‴, of the doors, C, may have edge plates to lap upon the middle portions of the cross beams, 5, these inner ends being necessarily narrower than the outer portions, c″, which latter close beneath the flanges of the cross beams. When the doors are dropped a small portion of the load falls between the doors, C, and down through the space between the members, 3—3, of the center sill. In this way pieces of material are sometimes lodged upon the top flanges of the center sill. Though pieces of such size as to prevent the closing of the doors rarely lodge on the center sill, in case they do, it is necessary to sweep them off before closing the doors. This difficulty may be wholly avoided by substituting the inverted V shaped flanges, 3″, Fig. 5, for the straight flanges 3‴, shown in Fig. 4. The relation between the trucks of the car and the doors at the ends of the car appear from the dotted lines showing the wheels, 12, of the truck. It will be noted that although the car is low, the doors immediately over the truck drop to such angles as to insure the free and complete discharge of the load.

For operating the doors I may employ either the winding shafts, 13, and chains, 14, of Figs. 1, 2 and 3, or the crank shafts, 15, shown in Fig. 5, or the compound levers, 16, and rocking shafts, 17, of Fig. 4. Whatever kind of mechanism is employed it may be of comparatively small dimensions as the doors are short and carry smaller proportions of the load than in other cars of the same class. It will be obvious also that the doors, C, transmit comparatively small strains to the operating mechanisms, inasmuch as these doors are practically balanced when loaded. The large doors, C, open most readily when their inner ends are relieved from part of the load and I therefore prefer that the small doors shall be opened first. To insure this desired operation of the doors I connect the operating shafts in such manner as to force the workmen to release the winding shaft of the small doors before unlocking the one which belongs to the large doors. A simple mechanism for accomplishing this result is shown in Fig. 2. As there shown the winding shafts, 13, are provided with ratchet wheels, 18—18', having pawls, 19 and 19' respectively. A locking block, 20, is adapted to hold the pawl, 19, in engagement with the ratchet, 18, and a block, 21, serves a like function in connection with the pawl, 19'. The block, 21, is connected with the pawl, 19, by a rod, 22. The ratchet, 18, represents the set of small doors, B, and on lifting the block, 20, the pawl, 19, may be disengaged from the ratchet to free the doors, B, whereupon they at once fall. The disengagement of the pawl, 19, from the ratchet, 18, serves to disengage the block, 21, from the pawl, 19', which may then be operated to free the ratchet, 18', and the large drop doors. As indicated in Fig. 3 the opening of the doors, B, serves to discharge practically half of the load. The major part of the remainder of the load rests upon the outer portions of the large doors, C, and is quickly discharged when the latter are dropped. The opening of the large doors uncovers the center sill and at such times the workmen may walk along the same while holding to the then elevated inner ends of the doors, B.

As before explained the car herein shown is merely typical of my invention. The invention is not limited thereto.

Having thus described my invention, I claim as new and desire to secure by Letters Patent:

1. A dump car having its floor composed of hinged drop doors arranged in two sets or rows, the doors of one set being shorter than those of the other set and the sets of doors being normally in substantial endwise abutment, substantially as described.

2. A dump car having its floor wholly composed of hinged drop doors arranged in two sets or rows, the doors of one set being shorter than those of the other set and the sets of doors being normally in substantial endwise abutment, substantially as described.

3. A dump car having two normally abutting sets of hinged drop doors, the doors of one set being longer than those of the other set, in combination with means for operating the doors of both sets, substantially as described.

4. A dump car having two normally abutting sets of hinged drop doors the doors of one set being longer than those of the other set, in combination with means for operating the short and the long doors successively, substantially as described.

5. A dump car having two normally abutting sets of hinged drop doors, the doors of one set being longer than those of the other set, in combination with means for operating and securing said doors and means compelling the opening or dropping of the short and long doors, successively, substantially as described.

6. A dump car having two normally abutting sets of hinged drop doors the doors of one set being longer than those of the other set, in combination with means for raising and securing said doors and means preventing the release of the longer doors until the short doors have been dropped, substantially as described.

7. A dump car having its floor wholly composed of short and long drop doors normally in endwise abutment and hinged upon parallel lines to close against respective sides of the car, substantially as described.

8. A dump car having its floor wholly composed of short and long drop doors normally in endwise abutment and hinged upon parallel lines to close against respective sides of the car, said long doors being pivoted substantially midway between their ends and hence partly balanced, substantially as described.

9. A dump car having its floor composed of two sets of drop doors of different lengths, the shorter doors being hinged at their inner ends to close against the adjacent car side and the longer doors being intermediately hinged to close against the other side of the car and the inner ends of the short doors, substantially as described.

10. A dump car having its floor composed of two sets of drop doors of different lengths the shorter doors being hinged at their inner ends to close against the adjacent car side and the longer doors being intermediately hinged to close against the other side of the car and the inner ends of the short doors, and door operating mechanisms, substantially as described.

11. A dump car, the floor of which contains three parallel rows of openings, in combination with a set of drop doors normally closing one row of said openings and a second set of doors normally closing both of the other rows of openings, substantially as described.

12. A dump car, the floor of which contains three parallel rows of openings, in combination with a set of drop doors normally closing one row of said openings, a second set of doors normally closing both of the other rows of openings and mechanisms for operating and securing said sets of doors, substantially as described.

13. A dump car, the floor of which contains three parallel rows of openings, in combination with a set of drop doors normally closing one row of said openings, a second set of doors normally closing both of the other rows of openings and mechanisms for operating and securing said sets of doors and for releasing them successively, substantially as described.

14. A dump car having a wide center sill and parallel rows of door openings, in combination with a set of doors hinged at one side of said sill and normally closing one of said rows of openings and another set of doors hinged at the other side of said sill, normally closing the other row of openings and also extending across said sill, into substantial abutment with the first set of doors, substantially as described.

15. A dump car having a wide center sill and parallel rows of door openings, in combination with a set of doors hinged at one side of said sill and normally closing one of said rows of openings and another set of doors hinged at the other side of said sill, normally closing the other row of openings and also extending across said sill into substantial abutment with the first set of doors and mechanism for operating and securing each set of doors, substantially as described.

16. A dump car having a wide center sill and parallel rows of door openings, in combination with a set of doors hinged at one side of said sill and normally closing one of said rows of openings and another set of doors hinged at the other side of said sill, normally closing the other row of openings and also extending across said sill into substantial abutment with the first set of doors, and mechanism for operating and securing each set of doors and interlocked operating and securing mechanisms for the two sets of doors adapted to insure the successive dropping thereof, substantially as described.

17. A dump car having two widely separated rows of drop door openings of substantially equal width and extending from end to end of the car in combination with short drop doors normally closing one row of said openings and long doors normally closing the other row of openings and constituting the car floor between the door openings, substantially as described.

18. A dump car comprising an underframe having an open or divided center sill, in combination with car sides, a set of short drop doors closing the space between one side and the center sill, another set of drop doors closing the opening in the center sill and the space between the sill and the other car side, and suitable door operating mechanisms, substantially as described.

19. A dump car comprising an underframe containing three rows of openings extending from end to end of the car, in combination with sides defining the outer edges of the outer rows of said openings, said underframe having members defining the middle row of openings and the inner edges of the outer rows of openings, short doors normally closing respective outer openings, longer doors hinged in the other row of outer openings and normally closing the same and the middle row of openings and said longer doors normally lapping upon the shorter doors, substantially as described.

20. A dump car comprising an underframe containing three rows of openings extending from end to end of the car, in combination with sides defining the outer edges of the outer rows of said openings, said underframe having members defining the middle row of openings and the inner edges of the outer rows of openings, short doors normally closing respective outer openings, longer doors hinged in the other row of outer openings and normally closing the same and the middle row of openings, said longer doors normally lapping upon the shorter doors and means for supporting said doors and for successively dropping the short and the long doors, substantially as described.

21. A dump car having three sets of drop door floor openings, in combination with a set of doors hinged at their ends and adapted to close one of said sets of openings and another set of intermediately hinged doors adapted to close both of the other sets of openings, substantially as described.

22. A dump car floor wholly composed of a set of short doors and a set of long doors hinged upon respective, parallel lines, said long doors having their ends in substantial abutment with the hinged ends of the short doors, substantially as described.

23. A dump car floor containing a set of short doors and a set of long doors hinged upon respective, parallel lines, said long doors having their ends in substantial abutment with the hinged ends of the short doors, substantially as described.

24. A dump car having its floor wholly composed of drop doors of differing lengths, hinged upon parallel lines adjacent to the middle line of the car and extending to respective sides of the car, the longer doors abutting the ends of the shorter doors, substantially as described.

25. A dump car comprising an underframe, sides and ends having its floor wholly composed of two sets of drop doors normally occupying the same plane and hinged upon lines parallel to the center line of the car, the doors of one set extending from the hinge line thereof to the adjacent side of the car and the doors of the other set extending from the same hinge line to the opposite side of the car, substantially as described.

26. A dump car having its floor composed of two sets of drop doors separated upon a line parallel with and at one side of the middle line of the car and hinged upon parallel lines on opposite sides of said middle line, substantially as described.

27. A dump car comprising bolsters, in combination with a center sill composed of members spaced apart, cross beams upon said sill, car sides at the ends of said bolsters and cross beams, drop doors hinged at one of said members and extending therefrom to the car side, other longer drop doors hinged at the other members and extending between the other car side and the first set of doors and means for operating said doors, substantially as described.

28. A dump car comprising bolsters, in combination with a center sill composed of members spaced apart and having inclined tops, cross beams upon said sill, car sides at the ends of said bolsters and cross beams, drop doors hinged at one of said members and extending therefrom to the car side, other longer drop doors hinged at the other member and extending between the other car side and the first set of doors and means for operating said doors, substantially as described.

29. The combination in a dump car of a wide center sill and a floor composed of hinged drop doors which are normally in substantial endwise abutment, means for operating said doors and said doors when dropped uncovering said sill, to serve as a walk or run way, substantially as described.

30. The combination in a dump car of an underframe having a wide center sill and a plurality of flanged bolsters and cross beams, drop doors hinged at the center sill to close against the flanges of said bolsters and beams, side or edge plates, the doors on one side of the center sill being long enough to normally cover said sill, substantially as described.

31. A dump car having two sets of drop doors which form its floor, one of said sets being adapted to discharge less than half the load of the car and the other set being adapted to discharge more than half of said load, substantially as described.

In testimony whereof, I have hereunto set my hand, this 27th day of March, 1908, in the presence of two subscribing witnesses.

ARTHUR LIPSCHUTZ.

Witnesses:
CHARLES GILBERT HAWLEY,
M. SIMON.